United States Patent [19]

Volk

[11] Patent Number: 5,619,909
[45] Date of Patent: Apr. 15, 1997

[54] FASTENER FOR SECURING MEAT TO A ROTISSERIE SPIT

[75] Inventor: Daniel J. Volk, Alpharetta, Ga.

[73] Assignee: Volk Enterprises, Inc., Turlock, Calif.

[21] Appl. No.: 566,127

[22] Filed: Dec. 1, 1995

[51] Int. Cl.⁶ .................................................. A47J 37/04
[52] U.S. Cl. ........................ 99/419; 24/16 PB; 99/421 H
[58] Field of Search ................................. 99/419, 421 H,
99/421 HH, 421 HV, 421 V; 24/300, 301,
715.3, 482, 16 PB, 20 R, 20 S

[56] References Cited

U.S. PATENT DOCUMENTS

| | | | |
|---|---|---|---|
| 3,147,690 | 9/1964 | Smith | 99/421 H |
| 3,486,200 | 12/1969 | Orenick | 24/16 PB |
| 3,875,620 | 4/1975 | Wells et al. | 24/16 PB |
| 4,369,697 | 1/1983 | Millington | 99/421 H X |
| 4,421,017 | 12/1983 | Ross | 99/421 H X |

Primary Examiner—Reginald Alexander
Attorney, Agent, or Firm—Flehr, Hohbac, Test, Albritton & Herbert

[57] ABSTRACT

A fastener for securing meat to a rotisserie spit. The fastener includes a thin elongate strap made from flexible plastic. The thin elongate strap has first and second end portions and a central portion extending between the end portions. The central portion has a large transverse dimension to provide a surface with a significant area for engaging the meat. The end portions cooperatively interengage for quickly securing the end portions together to retain the meat on the rotisserie spit during cooking. The surface with a significant area inhibits the central portion from embedding in the meat during cooking.

20 Claims, 1 Drawing Sheet

FASTENER FOR SECURING MEAT TO A ROTISSERIE SPIT

BACKGROUND OF THE INVENTION

1. Field of the Invention

This invention relates in general to fasteners for securing meat during cooking and pertains, more specifically, to fasteners for securing meat to a rotisserie spit.

2. Prior Art

Certain boneless meats such as pork or beef loins are often secured by prongs to rotisserie spits for cooking. String is currently provided for supporting the center of these boneless meats to the rotisserie spits during cooking. String fasteners, however, suffer from a number of disadvantages. For example, string is susceptible to being burned and possibly broken during cooking. In addition, the porosity of string makes it susceptible to discoloration during cooking. String can also become embedded in the meat so as to cause meat to become adhered thereto.

Other meats such as ribs have been mounted on rotisserie spits with elastic netting during cooking. The netting is typically made from an elastic material tightly wound with string. These nettings suffer from many of the disadvantages discussed above with respect to the string. There is, therefore, a need for a new and improved fastener for securing meats to rotisserie spits.

Accordingly, a primary object of the present invention is to provide a fastener which can be quickly secured about meat on a rotisserie spit.

Another object of the invention is to provide a fastener of the above character which is suitable for use with boneless meats such as beef or pork loins.

Another object of the invention is to provide a fastener of the above character which can be quickly uncoupled for releasing the meat from the rotisserie spit.

Another object of the invention is to provide a fastener of the above character which has a significant surface area for inhibiting the fastener from embedding in the meat during cooking.

Another object of the invention is to provide a fastener of the above character which is stretchable to accommodate meats of various sizes.

Another object of the invention is to provide a fastener of the above character which is constructed of a material that can withstand the temperatures required to cook meat.

Another object of the invention is to provide a fastener of the above character which can be color coded to reflect flavoring of the meat.

SUMMARY OF THE INVENTION

In general, the invention consists of a fastener for securing meat to a rotisserie spit. The fastener includes a thin elongate strap made from flexible plastic. The thin elongate strap has first and second end portions and a central portion extending between the end portions. The central portion has a large transverse dimension to provide a surface with a significant area for engaging the meat. Cooperative interengaging means is carried by the end portions for quickly securing the end portions together to retain the meat on the rotisserie spit during cooking. The surface with a significant area inhibits the central portion from embedding in the meat during cooking.

BRIEF DESCRIPTION OF THE DRAWINGS

The accompanying drawings, which are incorporated in and form a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that the invention is not limited to these embodiments. On the contrary, the invention is intended to cover alternatives, modifications and equivalents which may be included within the spirit and scope of the invention as defined by the appended claims.

Figure 1:
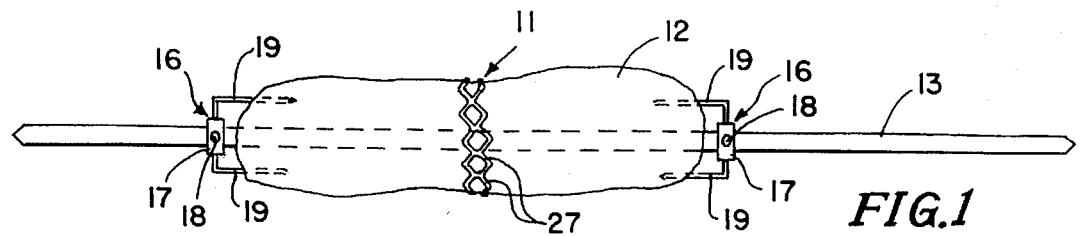
FIG. 1 is side elevational view of a rotisserie spit having a having a pork loin secured thereto with a fastener of the present invention.
Figure 2:
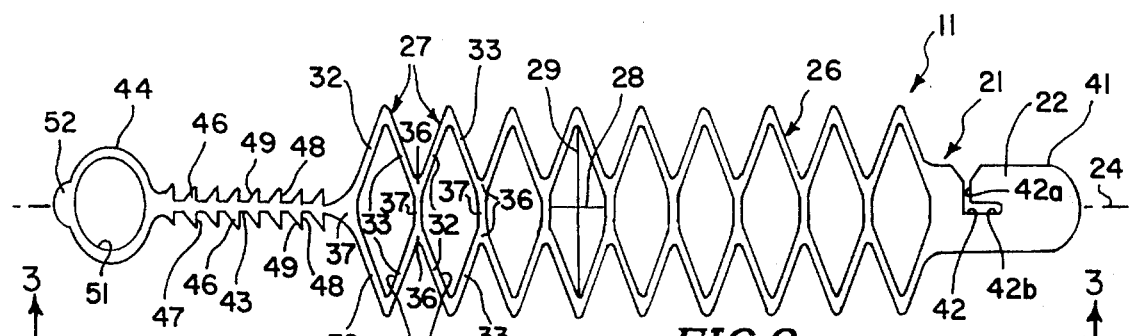
FIG. 2 is a top plan view of the fastener of FIG. 1.
Figure 3:
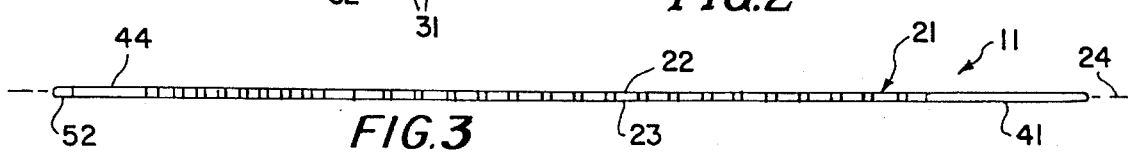
FIG. 3 is a side elevational view of the fastener of FIG. 2 taken along the line 3—3 of FIG. 2.

Turning now to the drawings, wherein like components are designated by like reference numerals throughout the various figures, attention is first directed to FIGS. 1 through 3 where one embodiment of the invention is illustrated.

Fastener 11 of the present invention is for mounting one or more pieces of meat such as a pork loin 12 to a conventional rotisserie rod or spit 13. In FIG. 1., one pork loin 12 is shown extending alongside spit 13 and secured thereto by a fastener 11. Adjustable means in the form of conventional first and second prong assemblies 16 are slidably mounted on spit 13 for further securing the pork loin 12 to the spit 13. Each prong assembly 16 includes a locking hub 17 carried about cylindrical spit 13 and provided with a bolt 18 for rigidly securing the prong assembly to spit 13. A plurality of at least two prongs 19 are carried by each locking hub 17 and extend in a direction parallel to the axis of rotisserie spit 13 for further securing pork loin 12 to the rotisserie spit.

Rotisserie fastener 11 is formed from a thin elongate generally planar member or strap 21 formed from any suitable flexible material such as nylon. The plastic material of strap 21 is capable of withstanding the range of temperatures necessary to cook meats. Body or strap 21 has first and second opposite planar surfaces 22 and 23 which are parallel to each other and the body or strap has a length, as illustrated in FIGS. 2 and 3, of approximately 12 inches and a thickness, as illustrated in FIG. 3, of approximately 0.06 inch. The strap 21 extends along a central longitudinal axis 24 and includes a stretchable central portion 26 having a length of approximately 7.2 inches and a large transverse dimension of approximately 1.8 inches. As such, central portion 26 has a significant cross-sectional area for engaging pork loin 12.

Central portion 26 is formed from a plurality of a adjoined hollow elements 27 spaced along longitudinal axis 24. Each of the hollow elements 27 is generally in the shape of a rhombus having a short diagonal which is identified by reference numeral 28 in FIG. 2 and extends along longitudinal axis 24 and a long diagonal which is identified by reference numeral 29 in FIG. 2 and extends perpendicular to short diagonal 28. Each of the hollow elements 27 is thus symmetrically centered on longitudinal axis 24. The hollow elements 27 are each formed with a central recess or hole 31 which extends through parallel planar surfaces 22 and 23 and is also generally in the shape of a rhombus. Each hollow element 27 is thus formed from two sets of adjoined first and second elongate members 32 and 33. Elongate members 32 and 33 of each set have a width of approximately 0.078 inch and extend at an angle of approximately 61.2° relative to each other. Adjacent elongate members 33 and 32 of adjoining hollow elements 27 extend from a common inner terminus 36 at a similar angle of approximately 61.2°. As such, the adjoined first and second elongate members 32 and 33 form a generally zig-zag configuration as they extend along the length of central portion 26. Hollow elements 27 further include parallel spaced-apart sidewalls 37 which extend between corresponding inner termini 36 disposed on opposite sides of longitudinal axis 24. Adjoining hollow elements 27 have a common sidewall 37 and each sidewall 37 has a width of approximately 0.078 inch. Substantially elastic central portion 26 can stretch longitudinally a distance equal to approximately one third of its length.

Band or strap 21 of fastener 11 further includes opposite first and second end portions formed integral with central portion 26. The first end portion of strap 21 is in the form of tab 41 extending from one endmost hollow element 27 a distance of approximately 1.8 inches. Tab 41 has a width of approximately 0.75 inch and is formed with an L-shaped slot 42 provided with a transverse portion 42a extending at an approximate right angle to longitudinal axis 24 and opening along one side of tab 41 and a longitudinal portion 42b extending from the inner end of slot portion 42a along axis 24 to a closed end. Transverse portion 42a has a thickness of approximately 0.08 inch and a longitudinal portion 42b has a thickness of approximately 0.1 inch. The second end portion of strap 21 includes an elongate or necked portion 43 extending along longitudinal axis 24 from the other endmost hollow element 27 of central portion 26 and a looped tab 44 formed at the outer end of necked portion or neck 43.

Slot 42 and neck 43 are included within the cooperative mating or interengaging means of the first and second end portions of strap 21 for releasably securing and locking the end portions together. In this regard, neck 43 is formed with a plurality of ridges 46 extending from each side of the neck in opposite alignment relative to longitudinal axis 24. More specifically, as shown in FIG. 2, neck 43 has eight ridges 46 extending from each side thereof. A recess or notch 47 is formed in neck 43 by each adjacent pair of ridges 46. Each ridge 46 is generally triangular in shape and is formed with a first surface 48 extending at a right angle to longitudinal axis 24 and a second surface 49 which adjoins first surface 48 and is inclined relative to the first surface at an angle of approximately 45°. First surfaces 48 face central portion 26. Ridges 46 are spaced apart a distance of approximately 0.1 inch. The thickness of neck 43 permits it to be slid sideways through transverse portion 42a of slot 42. Neck 43 has a width at each pair of aligned notches 47 which is less than the width of longitudinal portion 42b so as to permit the neck to move forwardly and rearwardly through the longitudinal portion 42b of slot 42. Each pair of aligned ridges 46 extends outwardly from neck 43 a distance sufficient to engage one of surfaces 22 or 23 of tab 41 on each side of slot longitudinal portion 42b so as to preclude the neck 43 from being pulled through longitudinal portion 42b when disposed therein. In this manner, the pair of aligned ridges 46 and tab 41 are included within the means of fastener 11 for adjustably securing the first and second end portions of strap 21 together.

Looped tab 44 is generally oblong in shape and is provided with an oblong-shaped central hole 51 extending therethrough. Hole 51 is sized so as to permit a finger of the human hand to extend therethrough. A rounded extension 52 is provided on the outer end of tab 44.

In operation and use, fastener 11 extends circumferentially around one or more pork loins 12 transverse of rotisserie spit 13 and intermediate prong assemblies 16 to secure the pork loins to the rotisserie spit while being cooked over an open flame or otherwise. More specifically, fastener 11 can be wrapped around a pork loin 12 extending longitudinally along the side of spit 13. In this procedure, tab 41 is grasped by the fingers of one hand and looped tab 44 is gripped by the fingers of the other hand. Tabs 41 and 44 are used to wrap fastener 11 around pork loin 12 until the looped tab 44 and at least a portion of neck 43 extend completely around pork loin 12 and spit 13 beyond tab 41. The engagement of central portion 26 with the outside of pork loin 12 causes the boneless pork loin to be folded snugly about rotisserie spit 13. The rhombus shaped hollow elements 27 permit the central portion to stretch while fastener 11 is being positioned about pork loin 12. The fastener 11 is longitudinally sized so that when it fully circumscribes the pork loin 12 and spit 13, neck 43 is disposed adjacent slot transverse portion 42a of tab 41 and extends at an approximate right angle to the tab 41. Oblong hole 51 permits a finger to be inserted through looped tab 44 for pulling fastener 11 taut against the pork loin and securing neck 43 to tab 41. In this regard, the neck 43 is slid sideways through transverse portion 42a of slot 42 and then longitudinally through portion 42b of the slot 42. First surfaces 48 of oppositely aligned ridges 46 engage one of surfaces 22 or 23 of tab 41 to preclude neck 43 from slipping through slot 42 and thus serve to lock the neck 43 within slot 42. The tensile forces of the tautly extended fastener 11 retain neck 43 within the closed end of slot longitudinal portion 42b.

Prong assemblies 16 serve to additionally retain pork loin 12 on rotisserie spit 13. Each of the prong assemblies is longitudinally positioned on rotisserie spit 13 so that prongs 19 of the assembly are embedded within the respective ends of pork loin 12. Bolts 18 are screwed down onto spit 13 to retain the prong assemblies 16 in their desired positions.

During cooking, the criss-crossed configuration of central portion 26 creates a desirable grilled look on the surface of pork loin 12 engaged thereby. The planar and bandlike construction of fastener 11 serves to spread its securing forces across pork loin 12 and thus inhibit the fastener 11 from digging into or burying itself within pork loin 12 during cooking. The plastic composition of the rotisserie fastener permits strap 21 to made from various colors corresponding to the various flavorings of the meats being cooked. Plastic fastener 11 easily retains this color during cooking so as to permit its color to be easily identified throughout the cooking procedure.

After pork loin 12 have been cooked as desired, the cooperatively mating locking arrangement of neck 43 in slot 42 permits the fastener 11 to be quickly removed from the pork loin 12. Tabs 41 and 44 are pulled away from each other to dislodge neck 43 from the closed end of slot longitudinal portion 42b. Once the neck 43 is adjacent slot transverse portion 42a, the neck 43 is slid sideways through transverse portion 42a and away from tab 41.

Although fastener 11 has been described as securing boneless pork loin 12 to a rotisserie spit 13, it should be appreciated that fastener 11 can be used with other boneless meats such as beef loins and deboned chicken breasts as well as roasts, ribs and other meats having bones therein and be within the scope of the present invention. It should also be appreciated that fastener 11 can be used for securing more than one piece of meat to a rotisserie spit, such as several pieces of meat spaced circumferentially around the rotisserie spit. In addition, a plurality of fasteners 11 can be spaced longitudinally along one or more pieces of meat for securing them to spit 13.

Figure 4:
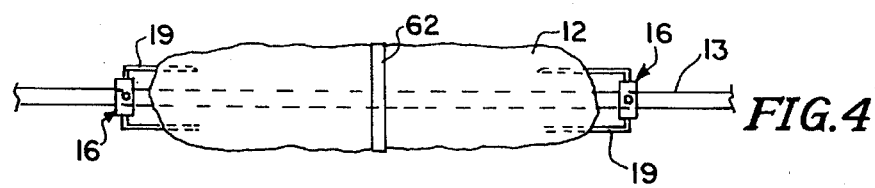
FIG. 4 is side elevational view of a rotisserie spit having a having a pork loin secured thereto with another embodiment of the fastener of the present invention.
Figure 5:
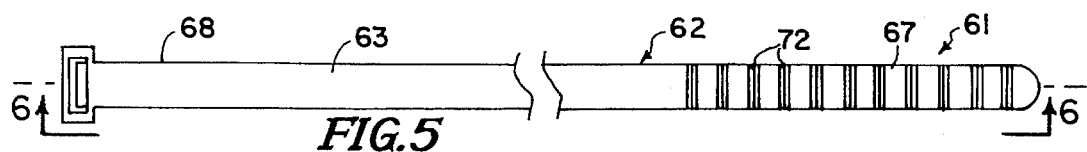
FIG. 5 is a top plan view of the fastener of FIG. 4.
Figure 6:
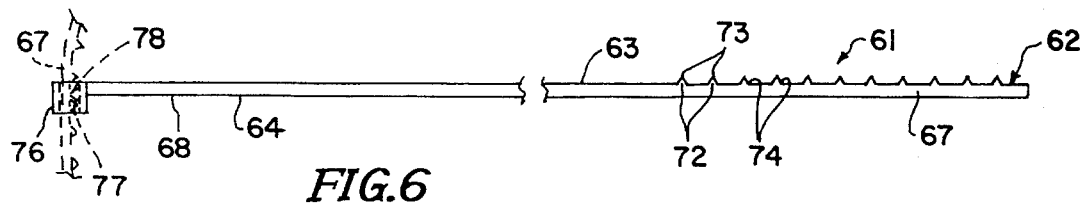
FIG. 6 is a side elevational view of the fastener of FIG. 4 taken along the line 6—6 of FIG. 5.

In another embodiment of the fastener of the present invention, a fastener 61 is provided which is similar to a conventional cable clamp. Fastener 61 is formed from a thin elongate member or band 62 made from any suitable material capable of withstanding cooking temperatures such as nylon plastic (see FIGS. 4–6). Body or band 62 has a length of approximately fourteen inches, a width as shown in FIG. 5 ranging from approximately 0.375 to 0.5 inch and a thickness as shown in FIG. 6 of approximately 0.125 inch. Strap or band 62 is formed with opposite first and second generally planar surfaces 63 and 64 and has first and second end portions 67 and 68 and a central portion 69 extending between the end portions. A plurality of longitudinally spaced-apart protuberances or ridges 72 are provided on first surface 63 at first end portion 67. Ridges 72 extend transversely across the first end portion 67 and are generally parallel to each other. Each ridge 72 is generally triangular in cross section, as shown in FIG. 6, and tapers as it extends outwardly from surface 63 to an outer edge 73. A notch 74 is formed by each adjacent pair of ridges 72.

A clasp 76 is carried by second end portion 68 for cooperatively mating with ridges 72 to secure the end portions 67 and 68 together. Clasp 76 is generally in the shape of a parallelepiped and is formed integral with the second end portion 68. The clasp 76 extends outwardly from second surface 64 and is provided with a bore or hole 77 extending therethrough between first and second surfaces 63 and 64. The hole 77 is sized and shaped to receive first end portion 67 of band 62. A protuberance in the form of ridge 78 is formed inside clasp 76 and extends along one side thereof into hole 77. Locking ridge 78 is aligned parallel with ridges 72 and is generally triangular in cross section as shown in FIG. 6.

Clasp 76 and ridges 72 are included within the cooperative mating or interengaging means of fastener 61 for quickly securing end portions 67 and 68 of band 62 together about the meat being cooked. The plurality of ridges 72 and ridge 78 within clasp 76 are further included within means for adjustably securing and locking end portions 67 and 68 together.

In operation and use, one or more strip fasteners 61 can be used for securing meat such as a pork loin 12 to a rotisserie spit 13 in substantially the same manner as discussed above with respect to fastener 11. A pork loin 12 is shown in FIG. 4 extending longitudinally behind rotisserie spit 13 and secured thereto by one fastener 61. The flexible fastener 61 is wrapped around pork loin 12. First end portion 67 is inserted into hole 77 of clasp 76 as shown in phantom lines in FIG. 6. As the first end portion 67 is pulled through clasp 76, ridges 72 thereon engage locking ridge 78. The cooperative triangular shapes of ridges 72 and 78 permit ridges 72 to be pulled past ridge 78 as the first end portion 67 is pulled further through clasp 76. Once pork loin 12 has been snugly secured to the rotisserie spit 13 by fastener 61, first end portion 67 is released. Locking ridge 78 then engages the ridge 72 which most recently passed thereby to preclude first end portion 67 from withdrawing from clasp 76.

Fastener 61 can be transversely sized so as to minimize the strip becoming embedded in the meat during cooking. In addition, fastener 61 can be color coded to indicate the flavor of the meat being cooked. After pork loin 12 has been cooked as desired, fastener 61 can be severed at any point along its length with a knife or scissors to release the pork loin from rotisserie spit 13.

Although certain measurements have been included for fasteners 11 and 61, it should be appreciated that the fastener of the present invention can be constructed in differing sizes to accommodate a variety of meats.

It is apparent from the foregoing that a new and improved fastener has been provided for securing meats to a rotisserie spit. The fastener can be quickly secured about the meat and is suitable for use with boneless meats such as beef or pork loins. The fastener can be quickly uncoupled for releasing the meat from the rotisserie spit and has a significant surface area for inhibiting the fastener from embedding in the meat during cooking. It is stretchable to accommodate meats of various sizes and can be color coded to reflect flavoring of the meat. In addition, the fastener is constructed of a material that can withstand the temperatures required to cook meat.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A fastener for securing meat to a rotisserie spit comprising a thin elongate strap made from flexible plastic, the thin elongate strap having first and second end portions and a central portion extending between the end portions, the central portion having a large transverse dimension relative to the meat to provide a surface with a significant area for engaging the meat and inhibiting the central portion from embedding in the meat during cooking and cooperative interengaging means carried by the end portions for quickly securing the end portions together to retain the meat on the rotisserie spit during cooking.

2. A fastener as in claim 1 wherein the central portion is stretchable.

3. A fastener for securing meat to a rotisserie spit comprising a thin elongate strap made from flexible plastic, the thin elongate strap having first and second end portions and a central portion extending between the end portions and formed from a plurality of adjoined hollow elements, the central portion having a large transverse dimension to provide a surface with a significant area for engaging the meat, and cooperative interengaging means carried by the end portions for quickly securing the end portions together to retain the meat on the rotisserie spit during cooking whereby the surface with a significant area inhibits the central portion from embedding in the meat during cooking.

4. A fastener as in claim 3 wherein the adjoined hollow elements are generally rhombus shaped.

5. A fastener as in claim 3 wherein the thin elongate strap extends along a longitudinal axis and wherein the adjoined hollow elements are symmetrically centered on the longitudinal axis.

6. A fastener as in claim 2 wherein the central portion is formed with an extendable zig-zag pattern.

7. A fastener as in claim 2 wherein the central portion is formed with a plurality of recesses therein for facilitating stretching thereof.

8. A fastener as in claim 1 wherein the cooperative interengaging means includes a slot provided in the first end portion and at least one notch provided in the second end portion for lockable disposition in the slot.

9. A fastener as in claim 8 wherein the second end portion has a plurality of notches spaced longitudinally therealong for adjustably securing the first and second end portions together.

10. A fastener as in claim 9 wherein the thin elongate strap has a central longitudinal axis and wherein the slot extends along the central longitudinal axis, the second end portion being formed with a necked portion for disposition in the slot.

11. A fastener as in claim 10 wherein the necked portion is formed with pairs of opposite transversely aligned ridges spaced along the central longitudinal axis for forming the plurality of notches.

12. A fastener for securing boneless meat to a rotisserie spit comprising a thin plastic member extending along a longitudinal axis and having first and second end portions and a central portion extending between the end portions, the thin plastic member having a length for permitting the thin plastic member to extend circumferentially around the boneless meat and the rotisserie spit, the central portion having opposite planar surfaces and a plurality of longitudinally spaced-apart holes extending between the planar surfaces for permitting the central portion to stretch as it extends around the boneless meat and the rotisserie spit, and cooperative interengaging means carried by the end portions for releasably securing the end portions together to retain the boneless meat on the rotisserie spit during cooking.

13. A fastener as in claim 12 wherein the cooperative interengaging means includes a tab forming a slot on the first end portion and a necked portion having a plurality of longitudinally spaced-apart notches for selective disposition in the slot formed on the second end portion, the tab and necked portion forming means for adjustably securing the first and second end portions together.

14. A fastener as in claim 13 wherein the slot and necked portion each extend along the longitudinal axis.

15. In combination, a rotisserie spit, at least one piece of boneless meat on the rotisserie spit, a thin elongate plastic strap fastener having a planar central portion and first and second end portions on opposite ends of the central portion, the central portion having a length for permitting the fastener to extend circumferentially around the piece of boneless meat transverse of rotisserie spit, the end portions having cooperative interengaging means to retain the piece of boneless meat on the rotisserie spit during cooking.

16. The combination of claim 15 wherein the fastner has opposite first and second planar surfaces.

17. The combination of claim 16 wherein the cooperative interengaging means includes a plurality of ridges spaced longitudinally along the first planar surface on the first end portion.

18. The combination of claim 17 wherein the second end portion is provided with a hole extending between the first and second planar surfaces and a protuberance extending into the hole for engaging one of the ridges to secure the first and second end portions together.

19. The combination of claim 1 wherein the thin elongate strap has a length for permitting the strap to extend circumferentially around the meat and the rotisserie spit.

20. The combination of claim 15 together with first and second adjustable means mounted on the rotisserie spit in longitudinally spaced-apart positions for engaging the piece of boneless meat extending therebetween to further secure the meat to the spit.

* * * * *